United States Patent [19]

Radke et al.

[11] Patent Number: 4,772,316
[45] Date of Patent: Sep. 20, 1988

[54] PROCESS FOR THE REDUCTION OF IRON-CONTAINING CHROME ORES

[75] Inventors: Dietrich Radke, Ratingen; Wilhem Janssen, Mülheim; Klaus Ulrich, Heiligenhaus, all of Fed. Rep. of Germany

[73] Assignee: Fried. Krupp GmbH, Essen, Fed. Rep. of Germany

[21] Appl. No.: 864,971

[22] Filed: May 20, 1986

[30] Foreign Application Priority Data

May 23, 1985 [DE] Fed. Rep. of Germany ....... 3518555

[51] Int. Cl.⁴ ............................................. C22C 33/00
[52] U.S. Cl. ........................................ 75/21; 75/36; 75/40; 75/84
[58] Field of Search ...................... 75/84, 21

[56] References Cited

U.S. PATENT DOCUMENTS 4,414,026 11/1983 Fukushima et al. ................ 266/173
4,629,506 12/1986 Ulrich et al. ....................... 75/10.63

Primary Examiner—Melvyn J. Andrews
Attorney, Agent, or Firm—Sughrue, Mion, Zinn, Macpeak and Seas

[57] ABSTRACT

Process for the reduction of iron containing chrome ores in which a mixture of chrome ore, coal and slag producers with an ore-coal ratio of 1:0.4 to 1:2 is heated in a rotating furnace in a CO containing atmosphere to temperatures of between 1100° and 1580° C. and in which the rotating furnace is heated in counter flow by a burner through the central nozzle of which oxygen and/or air is supplied. The burner is located at the reaction product discharge end of the furnace and 10 to 90% of the coal for the raw material mixture is introduced into the rotating furnace through the reaction product discharge end, with at least part of this coal being introduced through an outer nozzle of the burner.

17 Claims, 1 Drawing Sheet

PROCESS FOR THE REDUCTION OF IRON-CONTAINING CHROME ORES

BACKGROUND OF THE INVENTION

The present invention relates to a process for the reduction of iron-containing chrome ores in which a mixture of chrome ore, coal and slag producers, having an ore-coal ration of 1:0.4 to 1:2, and in which the slag producers CaO, MgO, $Al_2O_3$ and $SiO_2$ are present in such amounts that in the slag there is a $(CaO+MgO)/(Al_2O_3+SiO_2)$ ratio of 1:1.4 to 1:10 and a $Al_2O_3/SiO_2$ ratio of 1:05 to 1:5, is heated in a rotary furnace in a CO containing atmosphere for 30 to 90 minutes at a temperature of between 1100° and 1250° C., then for 30 to 90 minutes at a temperature of between 1400° and 1480° C., and finally for 20 to 240 minutes at a temperature of between 1480° and 1580° C.

In DE-PS No. 34 31 854, and corresponding U.S. patent application Ser. No. 06/684,322, filed on Dec. 20, 1984, now U.S. Pat. No. 4,629,506 and assigned to the same assignee as the present application, a process for the production of ferrochromium with a carbon content of 0.02 to 10% from iron-containing chrome ores is proposed, in which a mixture of chrome ores, solid carbon-containing fuels and slag producers are heated in a rotating furnace and in which the reaction product which is taken from the rotating furnace and cooled down is melted, whereby the ferrochromium is obtained. In this process, the reduction step functions in such a manner that a mixture of chrome ore, coal and slag producers, which has an ore-coal ratio of 1:0.4 to 1:2 and in which the slag producers CaO, MgO, $Al_2O_3$ and $SiO_2$ are present in such amounts that the slag contains a $(CaO+MgO)/(Al_2O_3+SiO_2)$ ratio of 1:1.4 to 1:10 and a $Al_2O_3/SiO_2$ ratio of 1:0.5 to 1:5, is heated in a rotating furnace in a CO-containing atmosphere for 30 to 90 minutes at a temperature of between 1100° and 1250° C., then for 30 to 90 minutes at a temperature between 1400° and 1480° C. and finally for 20 to 240 minutes at a temperature of between 1480° and 1580° C.

Although in the above reduction process a reduction level of more than 95% can be attained, it has been shown that the reduction level of the reaction product varies in a disadvantageous manner. These undesirable quality fluctuations were observed particularly in large-size rotating furnaces. In addition, the above reduction process has the disadvantage that the volatile components present in the coal escape from the rotating furnace in part unused when the rotating furnace is operated in a counter flow manner. In the contercurrent flow operation, the rotary furnace is heated with burner gases which are fed into one end of the furnace in a countercurrent flow to the raw material mixture which is fed into the furnace from the other end where gas discharge devices are arranged. Since in the counter flow operation the coal is contained in the raw material mixture which is fed into the rotating furnace from the side on which the gas discharge devices are also arranged, a part of the volatile coal components leaves the rotating furnace together with the furnace waste gases because the volatile components are driven out of the coal starting as soon as the raw material mixture is fed into the rotating furnace. Thus, because of the poor use of the volatile coal components, there is a disadvantageous increase in the use of coal.

SUMMARY OF THE INVENTION

A primary object of the present invention is to provide an improved process for reducing iron-containing chrome ore, in which variations in the reduction level are avoided and, in spite of a low coal consumption, an even high reduction level of more than 95% is attained.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for reducing iron-containing chrome ores in which a raw material mixture of chrome ore, coal and slag producers, in which the ore-coal ratio is from 1:0.4 to 1:2, and in which slag producers CaO, MgO, $Al_2O_3$ and $SiO_2$ are present in such amounts that in the slag there is a $(CaO+MgO)/Al_2O_3+SiO_2)$ ratio of 1:1.4 to 1:10 and a $Al_2O_3/SiO_2$ ratio of 1:0.5 to 1:5, is heated in a rotary furnace having a charging end and a reaction product discharge end, in a CO containing atmosphere for 30 to 90 minutes at a temperature of between 1100° and 1250° C., then for 30 to 90 minutes at a temperature of between 1400° and 1480° C., and finally for 20 to 240 minutes at a temperature of between 1480° and 1580° C., comprising: introducing a charging mixture of chrome ore, coal and slag producers into the charging end of the rotary furnace; heating the rotating furnace by a burner, which is at the reaction product discharge end, by burner gases which are in counter flow to the charging mixture, the burner having a central nozzle and at least one outer nozzle surrounding the central nozzle; introducing oxygen and/or air into the rotating furnace through the central nozzle; and introducing into the rotary furnace, from the reaction product discharge end, coal suspended in an inert carrier gas, or a gas which has a reducing effect, while maintaining a carbon excess relative to the carbon amounts needed for CO formation, in an amount such that 10 to 90% of the coal in the raw material mixture is introduced into the rotating furnace through the reaction product discharge end, with at least part of the coal introduced through the reaction product discharge end being introduced through the outer nozzle of the burner. Thus, in the present invention, the raw material mixture is comprised of (a) the charging mixture introduced the charging end of the rotary furnace and (b) the coal introduced through the reaction product discharge end of the rotary furnace.

By the process according to the present invention, it is attained that there always is, within the range of the burner flame, a reducing atmosphere, even when there is a slight oxygen surplus within the flame, because the coal introduced through the burner fully wraps the central oxygen and/or air stream, whereby the flame develops from the core of the burner stream towards the outside. The oxygen supplied to the rotating furnace is thus kept away from the reaction product by the coal wrap. In addition, reoxidation of the reaction product is prevented by the fact that a part of the coal introduced into the reaction product discharge end continuously provides a thin layer of unburned coal which is added to the furnace charge, which reliably covers the reduced matter and is constantly renewed.

The feeding in of the coal, as provided according to the present invention makes it possible that there is a largely continuous layer of coal which, in cooperation with the coal wrap of the burner stream, reliably prevents a reoxidation of the reaction product. For this reason, the process according to the present invention has the advantage that it is possible to produce consistently a reaction level of more than 95%.

Finally, by introducing coal into the reaction product discharge end of the furnace, the volatile components of this coal are not introduced into the rotating furnace together with charging mixture of raw materials and are almost quantitatively used for the reduction process, which reduces the coal requirement and improves consistency of the waste gases from the rotating furnace. In this manner it is advantageously possible to introduce all of the new coal which has a certain content of volatile materials into the rotating furnace through the reaction product discharge end of the rotary furnace, such as through the outer nozzles of the burner and to add to the charging mixture introduced through the charging end only coal which has already passed through the rotating furnace and which is then sent or recycled (recycled coke) to the charging end.

German patent application No. P34 22 267.7, filed in Germany on June 15, 1984 in the name of the assignee of the present application, and listing as inventors the names of the present inventors and published as German Offenlegungsschrift No. DE 34 22 267 A1 on Dec. 12, 1985, discloses a process for heating a reduction furnace for the reduction of metal oxides by means of solid fuels, in which a nozzle-type burner charges an open gas area of the furnace in counter flow and in which oxygen and/or air is led through the central nozzle of the burner and coal dust through a ring nozzle, but it was not to be expected that through this burner, coal can be introduced into the rotating furnace in such a manner that a largely continuous coal layer is formed on the furnace charge.

In one embodiment of the present invention, up to 50% of the coal which is to be fed into the rotating furnace through the reaction product discharge end of the furnace, is introduced from the discharge end into the rotating furnace by means of throw devices and/or pneumatic packer devices. This measure has been particularly successful in large rotating furnaces, because in this manner an even coal layer can be spread over the whole furnace charge.

Preferably, according to the present invention about 60% to 95% most prefered about 75% of the coal which flows through the burner gets into the rotating furnace below and on the side of the oxygen and/or air stream. In this way, the largest part of the coal is introduced into the furnace in direct proximity to the furnace charge which has an advantageous influence on the build-up of the coal layer.

According to the present invention it has proven particularly advantageous that coal with a content of volatile components of more than 20% by weight is fed into the rotating furnace only through the outer nozzle(s) of the burner, the throw devices and the pneumatic packer devices, from the discharge side of the furnace. This has the effect that the volatile components of the coal are almost quantitatively used for the reduction process and do not pollute the waste gas of the furnace.

The outer nozzle of the burner is in the form of at least one pipe, and according to the present invention, it has also proven particularly advantageous for the coal which is introduced into the rotating furnace through the outer nozzle of the burner to have a grain diameter of 0.0001 to 5 mm most prefered 0.0001 to 0.3 mm, whereby the maximum grain diameter is 1/10 of the smallest pipe diameter of the outer nozzle of the burner, and that the coal which is introduced into the rotating furnace through the throw devices and the pneumatic packer devices has a grain diameter of 0.1 to 40 mm, preferably 0.5 to 25 mm. A coal with the grain diameters according to the present invention can be introduced advantageously suspended in a carrier gas and pneumatically introduced into the furnace, whereby the coal with the largest grain diameter is thrown particularly far into the rotating furnace by the throw devices or the pneumatic packing devices. A certain amount of time is needed for the combustion of the coal particles, during which the coal wrap surrounding the oxygen and/or air stream, as well as the coal layer which is located on the furnace charge execute their protective effect, particularly as the coal layer also consists of large coal particles.

Finally, it is provided for, according to a preferred embodiment of the present invention, that into part of the rotating furnace which has a temperature of below 1250° C., air and/or oxygen is blown through pipes which only blow into the open furnace area in the direction of the furnace waste gas stream, with the discharge openings for the waste gas stream being are near the furnace axis and at the charging end of the furnace. Because of this measure the volatile coal components are burned in the preheating zone and the first reduction zone of the rotating furnace and largely quantitatively used. Because of the oxygen blown in through pipes there is no reoxidation as the oxygen immediately reacts with the volatile coal components, whereby in this part of the furnace the coal contained in the charging mixture of raw materials introduced from the charging end of the furnace also provides for a protection against reoxidation, as does the coal which is introduced from the reaction product discharge end (burner side) of the furnace.

It is to be understood that both the foregoing general description and the following detailed description are exemplary and explanatory, but are not restrictive of the invention.

DETAILED DESCRIPTION OF THE INVENTION

The present invention is explained in more detail below, based on a sample process.

Figure 1:
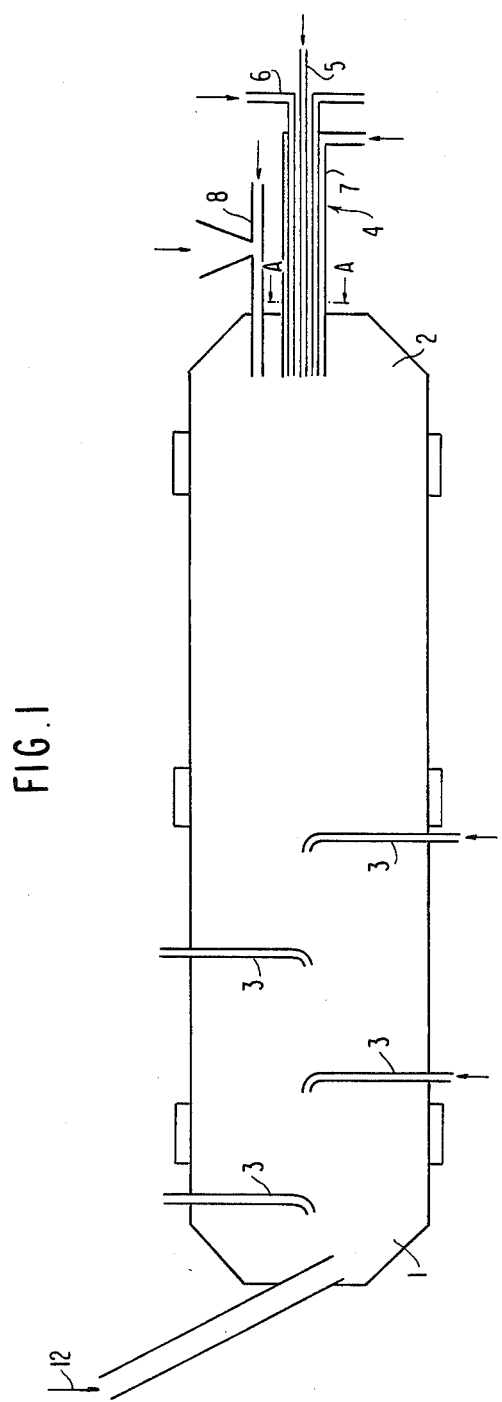
FIG. 1 is a schematic view showing a rotary furnace in a longitudinal section for use in practicing the process of the present invention.
Figure 2:
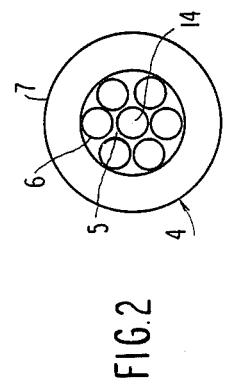
FIG. 2 is a sectional view along line A—A of FIG. 1, but in larger scale.

Referring now to the drawings, there is shown in FIG. 1 a rotary furnace 10 having a charging end 1 and a reaction product discharge end 2. A charging mixture of raw materials 12 is fed into charging end 1. Pipes 3 are provided within the preheating and first reduction zone of furnace 10 to feed air and/or $O_2$ into these zones. A burner 4 is located at the reaction product discharge end 2 and comprises a central nozzle 5 through which oxygen 14 is introduced into the furnace, a first outer ring nozzle in the form of a plurality of individual nozzles 6 surrounding central nozzle 5, and a second outer ring nozzle 7 surrounding nozzles 6. Coal is introduced into the furnace through nozzles 6 and 7. A pneumatic packer device 8 through which coal is introduced into the furnace is located at the reaction product discharge end 2 above burner 4.

A reduction process was executed in a rotating furnace having an inside diameter of 0.8 m and a length of 14 m. The furnace had a charging end and on an opposite side of the furnace a reaction product discharge end. The furnace was charged continuously with a charging mixture of raw materials which was introduced through the charging end of the furnace and consisting of chrome ore, recycled coke and slag producers. The chrome ore had a grain diameter of less than 2 mm and was introduced into the furnace in a quantity of 200 kg/h. The recycled coke had a grain diameter of less than 6 mm and was introduced into the furnace in a quantity of 50 kg/h. As slag producers, quartz sand in an amount of 16 kg/h was used, whereby the amounts of $SiO_2$, $Al_2O_3$, MgO and CaO contained in the lode material of the ore also acted as slag producers.

The rotating furnace was heated, in counter flow to the charging mixture of raw material introduced at the charging end, from the reaction product discharge side of the furnace by a burner which consisted of a central nozzle and a ring nozzle surrounding the ring nozzle. Oxygen was blown into the furnace through the central nozzle in the amount of 50 $Nm^3/h$ (=71.4 kg), while coal was introduced into the furnace through the ring nozzle in the amount of 100 kg/h. The blown-in coal was suspended in nitrogen and had a particle size of 0.0001 to 0.3 mm. It is possible to divide the ring nozzle of the burner which surrounds the central nozzle into several individual nozzles or to construct it in the form of several concentrically arranged ring nozzles. In addition, 100 kg/h coal with a particle diameter of 1 to 25 mm was thrust into the furnace through a pneumatic packer device.

The furnace charge was treated for 60 minutes at 1100° to 1250° C. during which a first reduction occurs, 60 minutes at 1400° to 1480° C. during which a second reduction occurs and 150 minutes at 1480° to 1550° C. during which a third reduction occurs. The total time for the furnace charge in the rotating furnace was 8 hours as the raw material mixture had to be heated in the furnace to the required processing temperatures.

The reaction product taken from the rotating furnace had a reduction level of 96%, i.e., 96% of the iron and the chromium were present in metallic form. The reaction product was ferrochromium and slag. The melting down can be done according to a known process, whereby the reaction product is put into the melting furnace either directly or after first cooling. The waste gas of the rotating furnace had the following composition: 1 to 3% CO, 25 to 30% $CO_2$, 0.5 to 1% $H_2$ and the remainder $N_2$.

Chrome ores generally consist of 20 to 50% $Cr_2O_3$, 10 to 40% FeO and 10 to 70% lode matter. The chrome ore used in the present example had the following composition: 31% Cr, 20.2% Fe, 7.9% Al, 0.06% Ca, 5.7% Mg, 0.5% C, 0.014% S, 0.01% P and the remainder O.

As the reduction of the chromium oxide only starts in an appreciable quantity with temperatures above 1250° C., the iron oxides contained in the chrome ore are selectively and to a large extend reduced by the first reduction phase at between 1100° and 1250° C. The thus resulting iron already forms small liquid droplets and takes up carbon and silicon which is produced by the reduction of a part of the $SiO_2$ contained in the raw material mixture. The metallic phase formed in the first reduction phase contains iron which is saturated with carbon, as well as about 1 to 10% silicon. The composition of the metallic phase formed in the first reduction phase was determined by analysis with a microprobe.

During the second reduction phase, executed at between 1400° to 1480° C., the metal droplets which formed during the first reduction phase become larger and absorb chromium which is formed through reduction between 1400° and 1480° C. The first and second reduction phases together have the effect of preventing the formation of chromium carbides with high melting temperature.

During the third reduction phase between 1480° and 1550° C., the remaining amount of the chromium oxide is reduced, whereby the metallic chromium is removed from the iron-carbon-silicon alloy and absorbed. The reduction of the chromium oxide takes place not only through the carbon of the coal, but also with strong participation of the silicon and carbon contents of the iron-carbon-silicon alloy. Parallel to this, the reduction of the $SiO_2$ through the coal and the absorption of the silicon through the iron phase continues, so that the silicon which is used up during the reaction

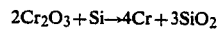

$$2Cr_2O_3 + Si \rightarrow 4Cr + 3SiO_2$$

is continuously supplemented in the liquid metallic phase. Because of the partial reduction of the chromium oxide with silicon which is dissolved in the iron-carbon-silicon alloy, the formation of chromium carbides with high melting temperatures is prevented. Because of the participation of the liquid alloy phase in the reduction, the reduction speed is increased as compared to a reduction reaction in which only solid reaction partners participate where the reduction speed is slower. The slag resulting from the reaction has the tendency not to bake onto the lining of the rotating furnace, even when softening, as it contains a large number of liquid metallic particles.

For the reduction of the chrome ore it is possible to use all types of coal, particularly high quality soft coal, hard coal and anthracite. The fresh coal used in this example had the following composition with regard to its waterfree content: 60% $C_{fix}$ (this is solid carbon which does not escape during the gasification of the coal), 30% volatile components and 10% ash.

The coal which is introduced into the rotating furnace as part of the charging mixture of raw materials at the charging end of the furnace should contain as little as possible of volatile components, which can be attained by circulating the excess coal (recycled coke), separated off from the reaction product and mixing it in with the remaining raw materials which form the charging mixture. Considered to be volatile components of the coal are the degassing and discharge gas products which leave the waterfree coal when heated under oxygen exclusion. The content of volatile components of the coal is determined by the fact that the waterfree coal is heated to temperatures between 120° and 1000° C. under oxygen exclusion and that the thus freed compounds are quantitatively recaptured.

The coal introduced into the rotating furnace through the burner serves for heating the furnace as well as for wrapping the flame as well as to cover the furnace charge. In large furnaces it is necessary and advantageous to introduce coal with a grain diameter 0.5 and 40 mm through throw devices and/or pneumatic packer devices—which in themselves are known—into the furnace, as the coal is thrust into the furnace up to a depth of 80% of the furnace length, which produces a maximum protective effect. The pneumatically working pneumatic packer devices are operated with air and are arranged at the reaction product discharge end of the furnace, above the burner on the side of the furnace furthest removed from the charging end. The large coal particles are flung by the throwing devices and pneumatic packer devices up to the preheating zone of the rotating furnace, while the coal supplied to the furnace through the outer nozzles of the burner mainly stays in the second and third reduction levels of the furnace on the furnace charge. In this manner it is attained that over the whole furnace area a maximum protection by the coal layer on top of the furnace charge is attained, particularly as the larger coal particles require a longer combustion time. In addition, there are so many volatile components of the coal in the preheating zone and in the first reduction zone of the furnace that they can be burned by using additionally added oxygen, without a reoxidation occurring because of the oxygen. The temperature profile of the furnace is regulated by the combustion of the volatile components.

When executing the process, care should be taken that the coal which is added to the charging mixture of raw materials at the charging end of the furnace contains as few volatile components as possible, because only in this manner can it be avoided that the volatile components leave the furnace unused together with the waste gas and pollute the waste gas in an undesirable manner. Because of the fact that in the procedure according to the invention a C/O mole ratio of $>1:1$ is maintained, there is, at least in the second and third reduction zone of the furnace, always a carbon surplus relative to CO, and the furnace atmosphere always contains CO. The temperature profile of the furnace can be adjusted in a favorable manner by the fact that the volatile components of the coal are burned mainly in the preheating zone and in the first reduction zone of the furnace. For this purpose, air and/or oxygen is blown through pipes, which as such as known, into the preheating zone and the first reduction zone of the furnace. There is no reoxidation of the metallic components already formed in these two zones as there is an almost complete coal layer on top of the furnace charge and the metallization level of the furnace charge still is very low. For the rest, the supplied oxygen is rapidly consumed by the combustion of the volatile components, which preferably takes place near the input pipes.

The reaction product leaving the rotating furnace contains the ferrochromium which is obtained by melting down. After the melting down, the ferrochromium consists of 20 to 70% chromium, 0.02 to 10% carbon and the remainder iron. Ferrochromium is used as master alloy in the manufacturing of chrome steel.

All the percent numbers which indicate the composition of substances and are designated by the symbol %, represent percent by weight. The ratios which describe the composition of substance mixtures and are not described in more detail are weight ratios.

The ore and coal in the raw material mixture contain slag producers, and if additional slag producers are necessary to achieve the desired ratios, separate additions of CaO, MgO, $Al_2O_3$ and $SiO_2$ can be made as necessary.

It will be understood that the above description of the present invention is susceptible to various modifications, changes and adaptations, and the same are intended to be comprehended within the meaning and the range of equivalents of the appended claims.

What is claimed is:

1. In a process for the reduction of iron-containing chrome ores in which a raw material mixture of chrome ore, coal and slag producers, in which the ore-coal ratio is from 1:0.4 to 1:2 and in which slag producers CaO, MgO, $Al_2O_3$ are present in such amounts that in the slag there is a $(CaO+MgO)/Al_2O_3+Si_2)$ ratio of 1:1.4 to 1:10 and a $Al_2O_3/SiO_2$ ratio of 1:0.5 to 1:5, is heated in a rotary furnace having a charging end and a reaction product discharge end, in a CO containing atmosphere for 30 to 90 minutes at a temperature of between 1400° and 1480° C., and finally for 20 to 240 minutes at a temperature of between 1480° and 1580° C. to reduce the chrome ore and form a reaction product from which ferrochromium is to be subsequently melted, the improvement comprising:

introducing a charging mixture of chrome ore, coal and slag producers into the charging end of the rotary furnace;

heating the rotary furnace by a burner, which is at the reaction product discharge end, by burner gases which are in counter flow to the charging mixture, the burner having a central nozzle and at least one outer nozzle surrounding the central nozzle;

introducing oxygen and/or air into the rotary furnace through the central nozzle; and introducing into the rotary furnace, from the reaction product discharge end, coal suspended in an inert carrier gas, or a gas which has a reducing effect, through the outer nozzle, while maintaining a carbon excess relative to the carbon amounts needed for CO formation, in an amount such that 10 to 90% of the coal in the raw material mixture is introduced into the rotary furnace through the reaction product discharge end, with at least part of the coal introduced through the reaction product discharge end being introduced through the outer nozzle of the burner.

2. Process according to claim 1, wherein up to 50% of the coal which is introduced into the rotary furnace through the reaction product discharge end is introduced into the rotary furnace by throw devices and/or pneumatic packer devices.

3. Process according to claim 2, wherein about 75% of the coal which flows through the burner is introduced into the rotary furnace below and on the side of the oxygen and/or air stream.

4. Process according to claim 2, wherein coal with a content of volatile components of more than 20% is introduced into the rotary furnace only through the outer nozzle of the burner, the throw devices and the pneumatic packer devices from the reaction product discharge end.

5. Process according to claim 2, wherein the outer nozzle of the burner is in the form of at least one pipe and the coal which is introduced into the rotary furnace through the outer nozzle of the burner has a grain diameter of 0.0001 to 5 mm, and the maximum grain diameter is 1/10 of the smallest pipe diameter of the outer nozzle of the burner, while the coal which is introduced into the rotary furnace through the throw devices and the pneumatic packer devices has a grain diameter of 0.1 to 40 mm.

6. Process according to claim 5, wherein the coal which is introduced into the rotating furnace through the throw devices and the pneumatic packer devices has a grain diameter of 0.5 to 25 mm.

7. Process according to claim 1, wherein into that part of the rotary furnace which has a temperature below 1250° C., air and/or oxygen is blown through pipes which only blow into the open furnace area in the direction of the furnace waste gas stream, with discharge openings for the waste gas stream being near the furnace axis.

8. Process according to claim 2, wherein the coal which is introduced through the throw devices and pneumatic packer devices has a grain diameter larger than the grain diameter of the coal introduced through the outer nozzle of the burner.

9. Process according to claim 8, wherein the coal which is introduced into the rotary furnace through the outer nozzle has a grain size of 0.0001 to 0.3 mm and the coal which is introduced through the throw devices and the pneumatic packer devices has a grain diameter 0.5 to 25 mm.

10. Process according to claim 1, wherein coal with a content of volatile components of more than 20% is introduced into the rotary furnace only through the outer nozzle of the burner.

11. Process according to claim 1, wherein the outer nozzle of the burner is in the form of at least one pipe and the coal which is introduced into the rotary furnace through the outer nozzle of the burner has a grain diameter of 0.0001 to 5 mm, and the maximum grain diameter is 1/10 of the smallest pipe diameter of the outer nozzle of the burner.

12. Process according to claim 2, wherein the coal which is introduced into the rotary furnace through the throw devices and the pneumatic packer devices has a grain diameter of 0.1 to 40 mm.

13. In a process for the reduction of iron-containing chrome ores in which a raw material mixture of chrome ore, coal and slag producers, in which the ore-coal ratio is from 1:0.4 to 1:2, is heated in a rotary furnace having a charging end and a reaction product discharge end, in a CO containing atmosphere at a temperature of between 1100° and 1580° C. to reduce the chrome ore and form a reaction product from which ferrochromium is to be subsequently melted, comprising introducing a charge mixture of chrome ore, coal and slag producers into the charging end of the rotary furnace;

heating the rotary furnace by a burner, which is at the reaction product discharge end, by burner gases which are in counter flow to the charging mixture, the burner having a central nozzle and at least one outer nozzle surrounding the central nozzle;

introducing oxygen and/or air into the rotary furnace through the central nozzle; and introducing into the rotary furnace, from the reaction product discharge end, coal suspended in an inert carrier gas, or a gas which has a reducing effect, through the outer nozzle, while maintaining a carbon excess relative to the carbon amounts needed for CO formation, in an amount such that 10 to 90% of the coal in the raw material mixture is introduced into the rotary furnace through the reaction product discharge end, with at least part of the coal introduced through the reaction product discharge end being introduced through the outer nozzle of the burner.

14. Process according to claim 2, wherein the about 60 to 95% of the coal which flows through the burner is introduced into the rotary furnace below and on the side of the oxygen and/or air stream.

15. Process according to claim 1, wherein coal introduced through the burner forms a largely continuous coal layer on the raw material mixture in the furnace.

16. Process according to claim 1, wherein the furnace is charged continuously with a charging mixture of raw materials.

17. Process according to claim 16, wherein coal introduced through the reaction product discharge end forms a largely continuous coal layer on the raw material mixture in the furnace which layer is constantly renewed.

* * * * *